No. 635,620. Patented Oct. 24, 1899.
J. W. WALTERS.
MOTOR WHEEL FOR VEHICLES.
(Application filed May 1, 1899.)

(No Model.) 7 Sheets—Sheet 1.

WITNESSES:
Paul Hogstrom
Alfred Ludekens

INVENTOR:
Julius W. Walters,
BY
ATTORNEY.

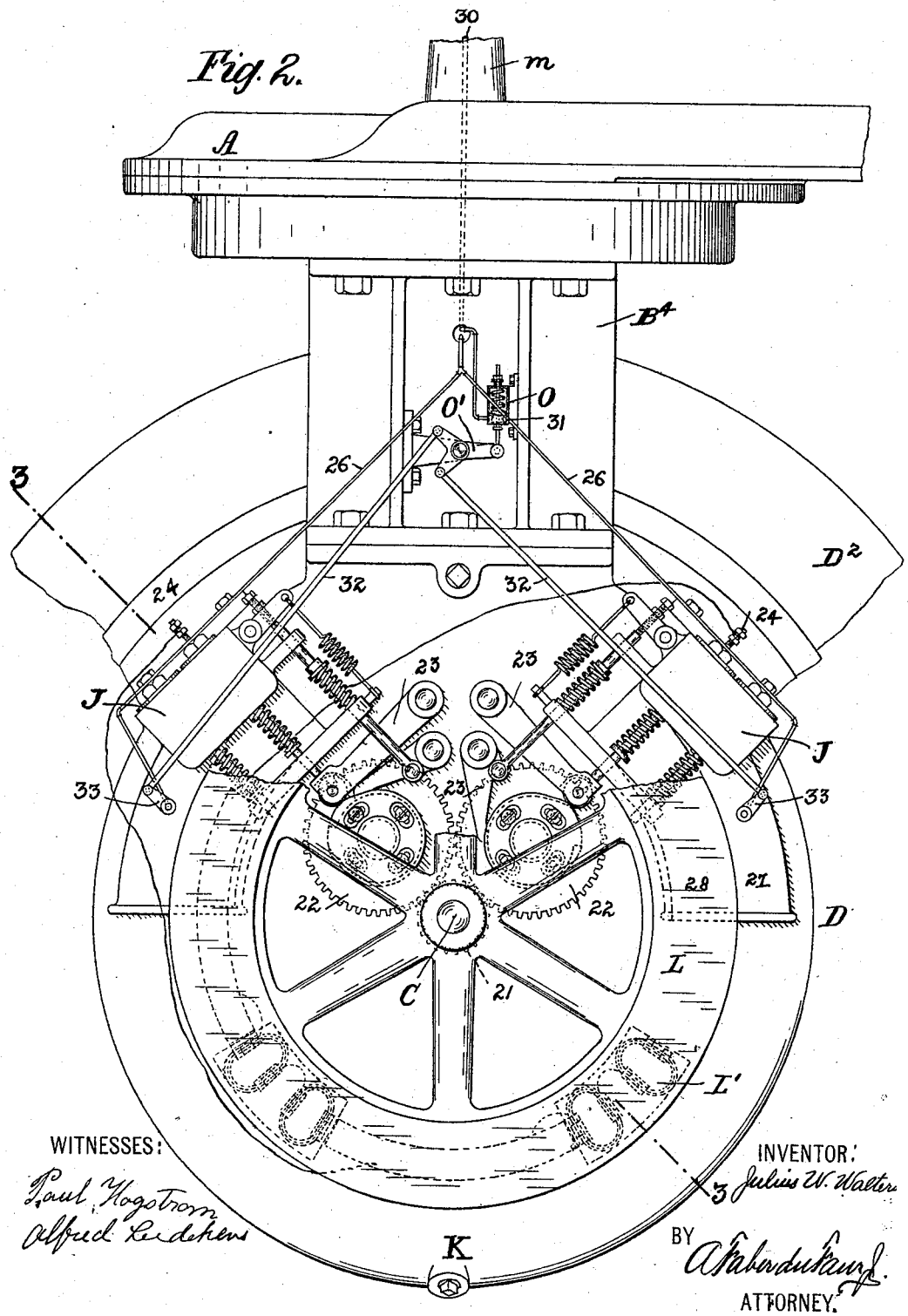

No. 635,620. Patented Oct. 24, 1899.
J. W. WALTERS.
MOTOR WHEEL FOR VEHICLES.
(Application filed May 1, 1899.)
(No Model.) 7 Sheets—Sheet 3.
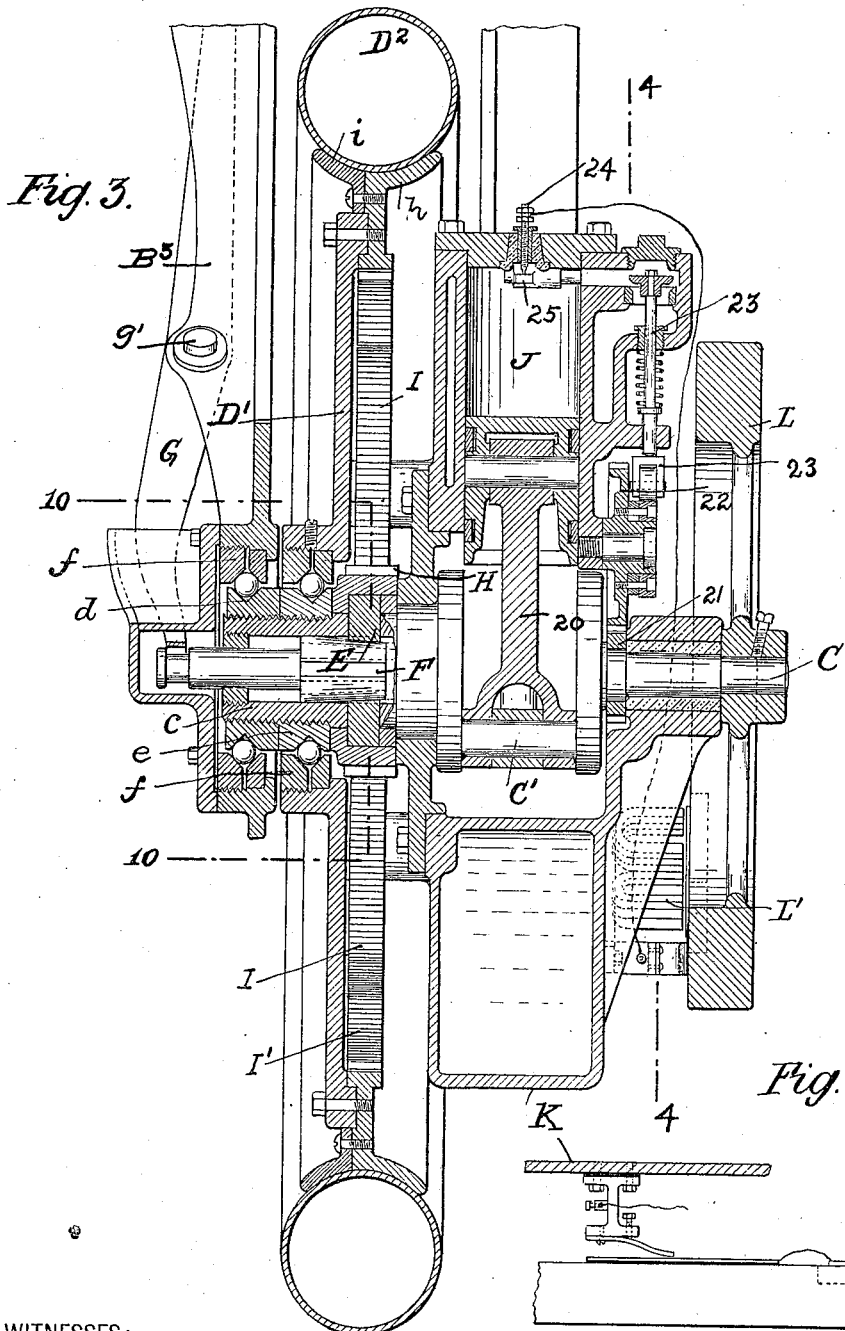
WITNESSES:
Paul Hogstrom
Alfred Ludekens
INVENTOR:
Julius W. Walters,
BY
ATTORNEY.

No. 635,620. Patented Oct. 24, 1899.
J. W. WALTERS.
MOTOR WHEEL FOR VEHICLES.
(Application filed May 1, 1899.)
(No Model.) 7 Sheets—Sheet 4.
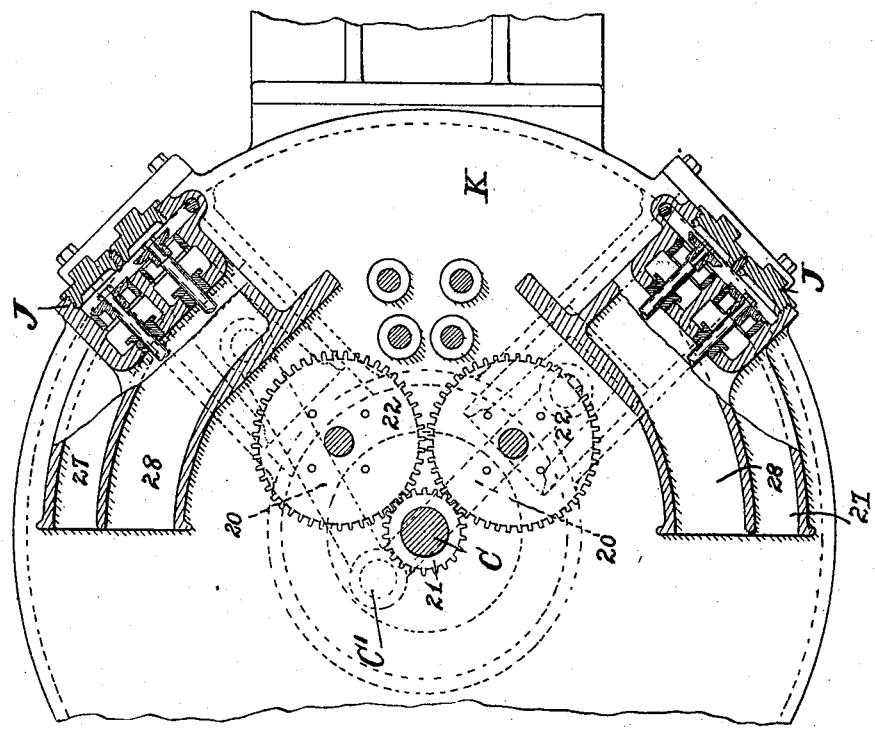
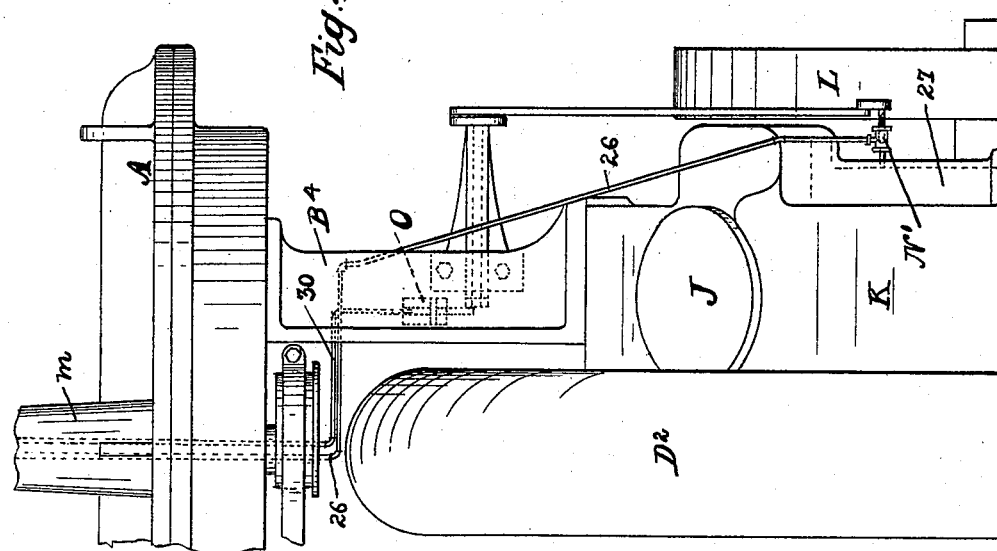
WITNESSES: INVENTOR:
Paul Hogstrom Julius W. Walters,
Alfred Ludkins BY
ATTORNEY.
THE NORRIS PETERS CO., PHOTO-LITHO., WASHINGTON, D. C.

No. 635,620. Patented Oct. 24, 1899.
J. W. WALTERS.
MOTOR WHEEL FOR VEHICLES.
(Application filed May 1, 1899.)

(No Model.) 7 Sheets—Sheet 5.

WITNESSES:
Paul Hagstrom
Alfred Ludekens

INVENTOR:
Julius W. Walters,
BY
ATTORNEY.

THE NORRIS PETERS CO., PHOTO-LITHO., WASHINGTON, D. C.

No. 635,620. Patented Oct. 24, 1899.
J. W. WALTERS.
MOTOR WHEEL FOR VEHICLES.
(Application filed May 1, 1899.)
(No Model.) 7 Sheets—Sheet 6.

WITNESSES:
Paul Hagstrom
Alfred Ludekens

INVENTOR:
Julius W. Walters
BY
ATTORNEY.

THE NORRIS PETERS CO., PHOTO-LITHO., WASHINGTON, D. C.

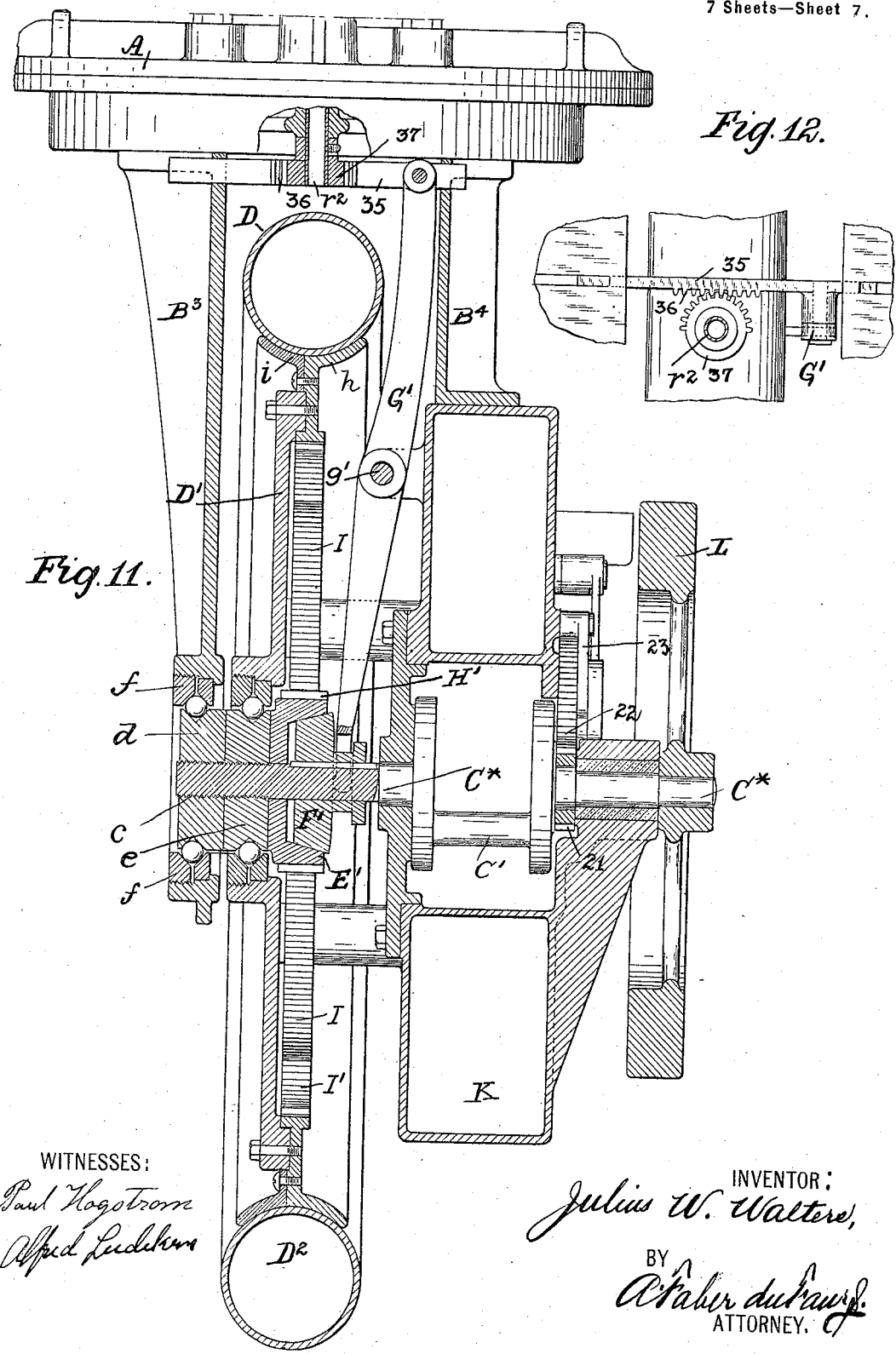

UNITED STATES PATENT OFFICE.

JULIUS WM. WALTERS, OF NEW YORK, N. Y.

MOTOR-WHEEL FOR VEHICLES.

SPECIFICATION forming part of Letters Patent No. 635,620, dated October 24, 1899.

Application filed May 1, 1899. Serial No. 715,092. (No model.)

*To all whom it may concern:*

Be it known that I, JULIUS WM. WALTERS, a citizen of the United States of America, residing at the borough of Manhattan, in the city, county, and State of New York, have invented certain new and useful Improvements in Motor-Wheels for Vehicles, of which the following is a specification.

My invention has reference to improvements in means for propelling vehicles, and particularly to improvements in the constructions shown in my prior patent, No. 624,414, dated May 2, 1899; and it has for its object to simplify the construction of the propelling mechanism and to provide means for reversing the direction of motion of the vehicle without the use of a reversing mechanism applied to the engine-motor.

The nature of my invention will best be understood and described in connection with the accompanying drawings, in which—

Figure 1:
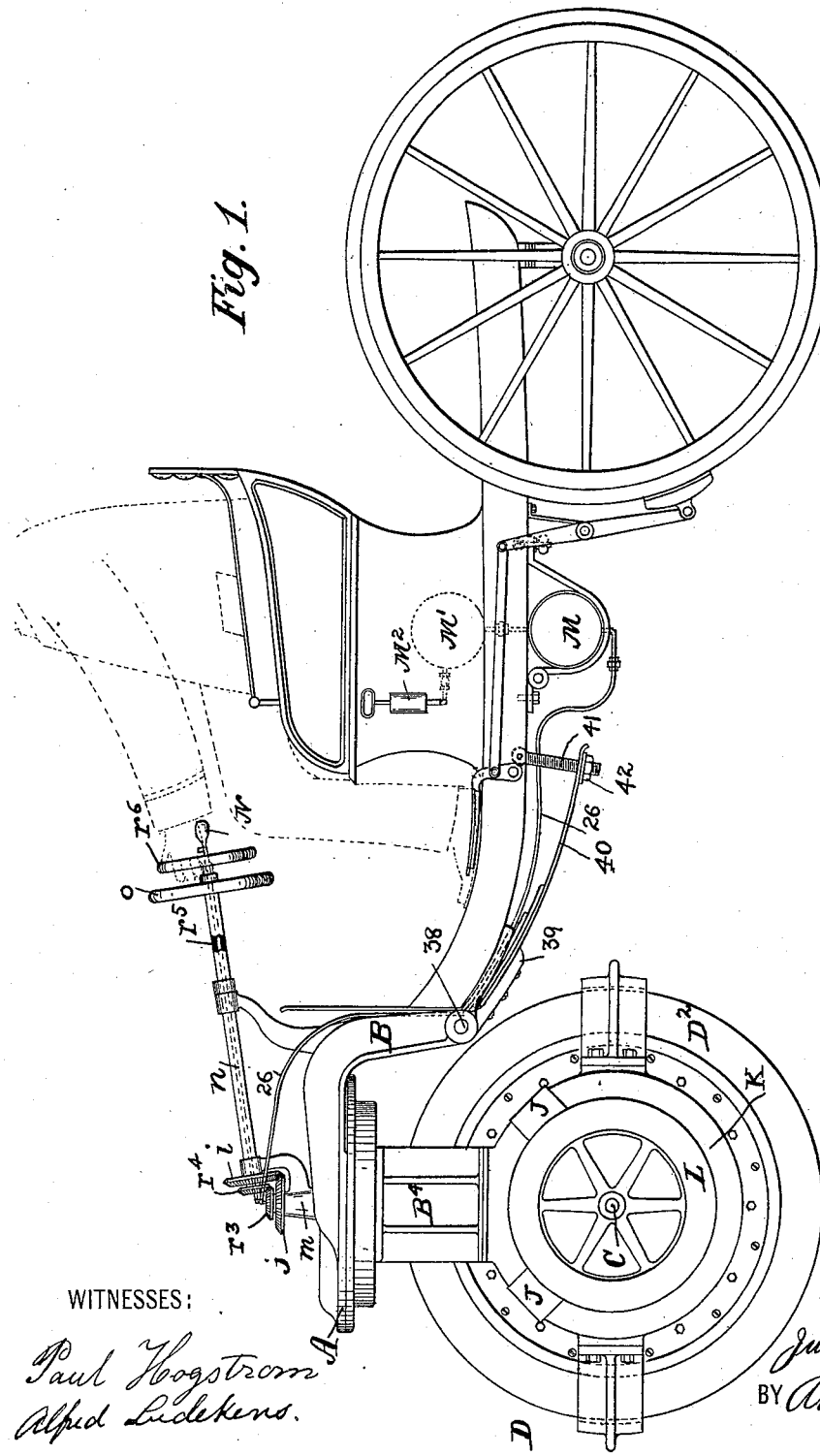
Figure 1:
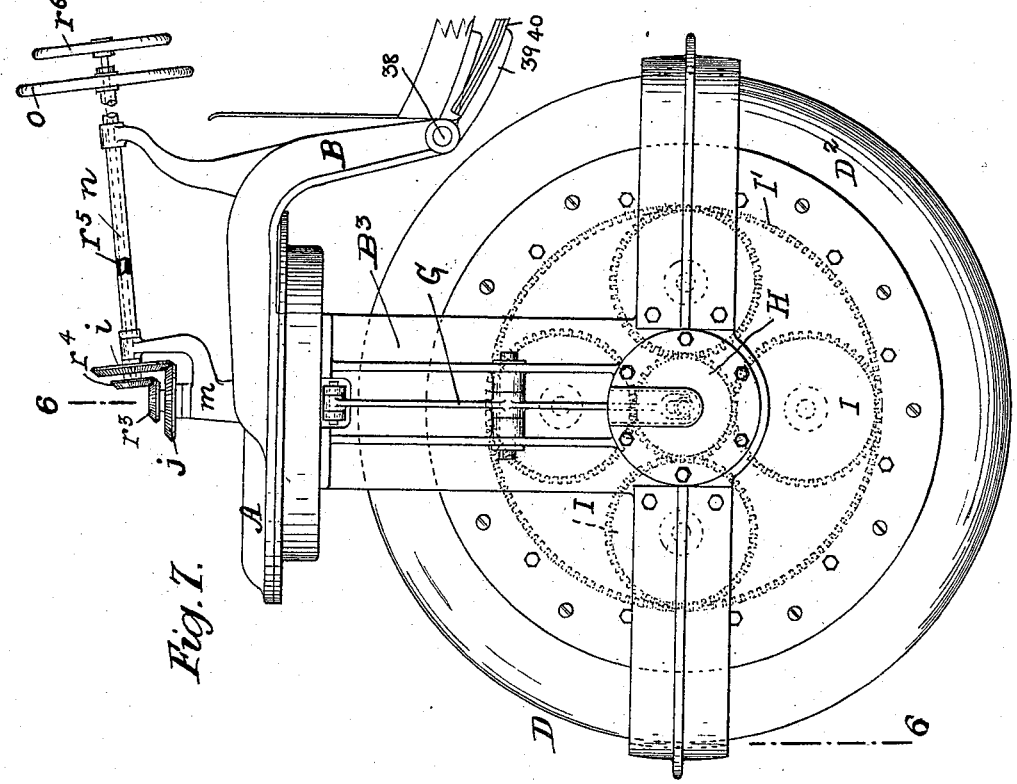
Figure 6:
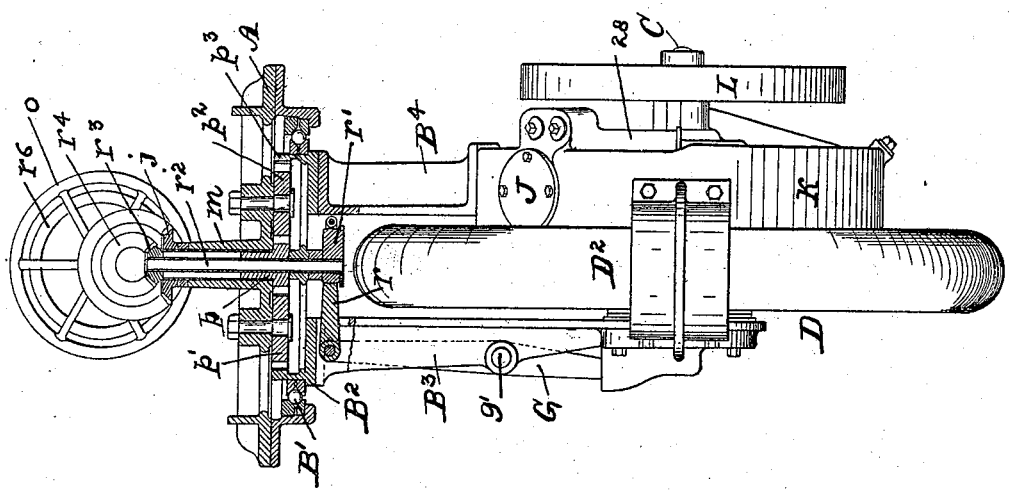
Figure 8:
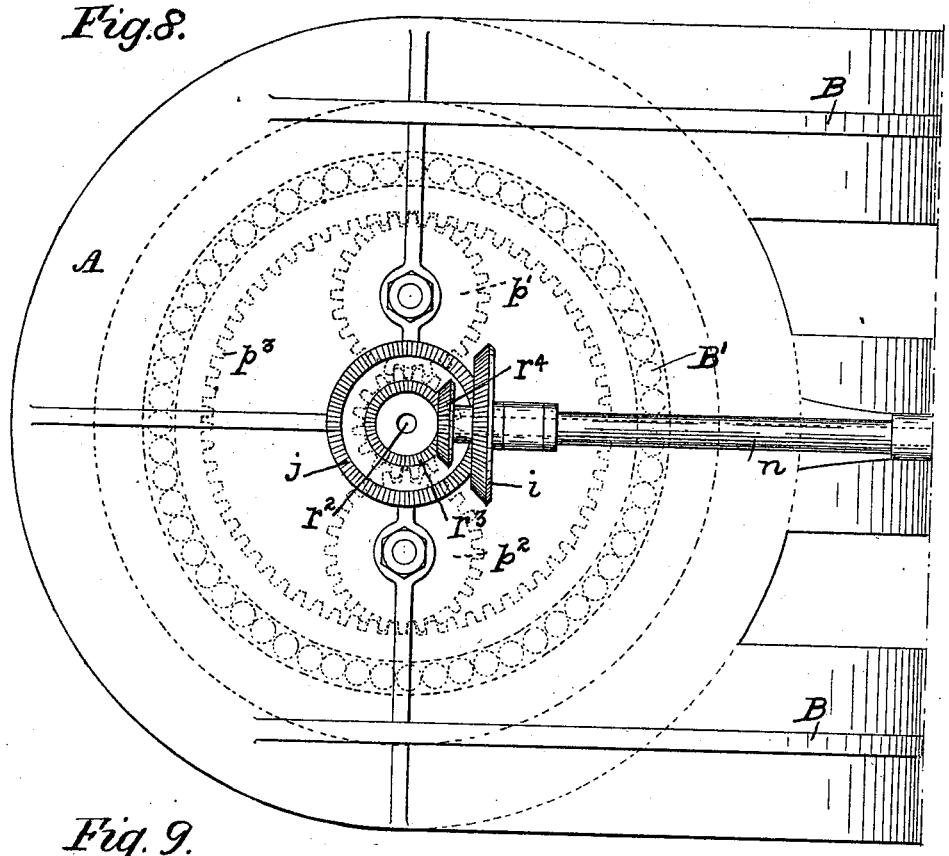
Figure 9:
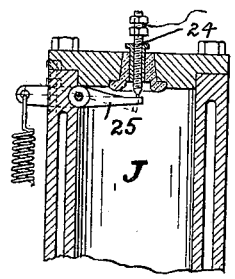
Figure 10:
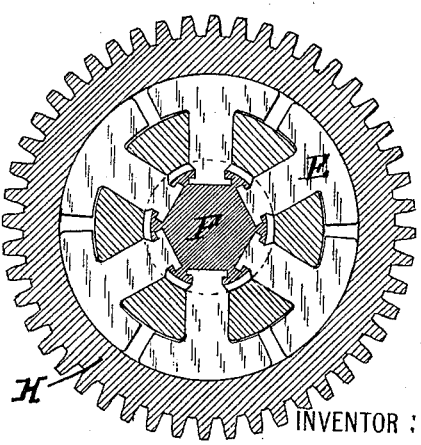

Figure 1 represents a side elevation of a vehicle embodying my improved traction-wheel arranged as the front wheel. Fig. 2 is a side elevation, on an enlarged scale, of the traction-wheel, part of the same being broken away. Fig. 3 is a cross-section on the line 3 3, Fig. 2. Fig. 3* is a plan view of a detail part of the igniting mechanism for the engines. Fig. 4 is a sectional side elevation illustrating the construction of the engines and their connections, the section being taken on the line 4 4, Fig. 3. Fig. 5 is a front elevation of parts shown in Fig. 2. Fig. 6 is a sectional front view, the plan of section being on the line 6 6, Fig. 7. Fig. 7 is a side elevation showing the driving-wheel turned around at right angles to the position shown in Fig. 1, so as to reverse the movement of the vehicle when the said wheel is rotated by the motor. Fig. 8 is a plan or top view illustrating the gear connection for starting, stopping, and revolving the wheel. Fig. 9 is a longitudinal section through one of the cylinders of one of the engines. Fig. 10 is a vertical section on the line 10 10, Fig. 3. Fig. 11 is a transverse vertical section illustrating a modified form of clutch. Fig. 12 is a detail view of one of the parts of the construction shown in Fig. 11.

Similar letters and numerals of reference designate corresponding parts throughout the several views of the drawings.

In the example illustrated in the drawings I have shown the traction-wheel applied to a vehicle having two hind wheels; but of course it is to be understood that the traction-wheel may be applied to a vehicle having but one hind wheel—such, for instance, as a bicycle—or that two traction-wheels may be used either at the front or at the rear of the vehicle, the particular arrangement or location of the traction-wheel forming no part of my present invention.

To the body or platform of the vehicle is attached a bearing-plate A, preferably by means of one or more suitable hinges and brackets B, which said plate engages with ball-bearings B' on a plate $B^2$, which may be considered in the nature of a fifth-wheel and which said plate is provided with downwardly-projecting hangers $B^3$ $B^4$, adapted to support indirectly the traction-wheel D, by means of which the vehicle is propelled. The connection between the plate $B^2$ and the plate A is illustrated in detail in Fig. 6 and need not be more fully described. In the hangers $B^3$ $B^4$ is mounted a crank-shaft C, which forms also the axle of the wheel D and is provided at one end with a suitable bearing in the hanger $B^4$ and at its other end with a threaded portion $c$, screwing into the sleeves $d$ and $e$ of suitable ball-bearings, the said sleeve $d$ bearing in the hanger $B^3$ and the said sleeve $e$ forming a bearing for the web D' of the wheel D in combination with the usual adjusting-cones $f$. The threaded end of the crank-shaft is made hollow, as shown in Fig. 3, and is slotted circumferentially, as shown in Fig. 10, and passes through the female portion of a clutch E, which latter is cored out centrally and adapted to receive a conical or wedge-shaped portion F, arranged to be actuated by means of a lever G to throw in or out a gear H, adapted to actuate the traction-wheel by means of a planetary system of any usual construction. In the present example I have shown this system to consist of a plurality of equally-distributed gear-wheels I, adapted to engage with said gear-wheel H and with a circular rack I', attached to the web D' of the traction-wheel D in a suitable manner—as, for instance, by the bolt shown in Fig. 3—and said rack also being provided with a flange $h$, which, in conjunction with the flange $i$ on the web D', forms the bearing for the pneumatic tire $D^2$, surrounding the wheel. Of course it is understood that the pneumatic tire may be omitted and either a cushion-tire substituted or the wheel provided with an ordinary tire, as commonly used in vehicles.

In the construction illustrated in my prior patent above referred to the vehicle is reversed by a reversing mechanism, while the motor continues to run in one direction. To simplify this construction, I so arrange the traction-wheel $D'$ that it can be turned completely about its vertical journal. When the vehicle is brought to a stop and the wheel turned through an angle of one hundred and eighty degrees, the vehicle will be caused to move in a direction opposite to its former course. In other words, its motion will be reversed. It will be readily understood that with this construction all reversing mechanism—that is, mechanism adapted to reverse the direction of rotation of the motor-wheel—is omitted. In Figs. 1, 6, 7, and 8 I have shown the means for accomplishing this object, which said means are as follows: As before stated, the hangers $B^3$ $B^4$, supporting the traction-wheel and parts thereto appertaining, are pendent from a plate $B^2$, which can turn freely with respect to the table A, attached to the frame of the vehicle. The plate A is attached to a tubular guide, in which the shaft $m$ extends vertically upward, and is provided at its top with a bevel-gear $j$, into which meshes a bevel-gear $i$, secured to the end of a tubular shaft $n$, which is mounted in proper bearings in a usual manner and has at its end a hand-wheel $o$ in a convenient position to be within reach of the driver. It will be readily understood that when this hand-wheel is turned by the driver the rotary motion of the shaft $n$ is transmitted through the gears mentioned to the plate $B^2$. In order to reduce the motion, so as to render the turning of the traction-wheel D more easy, the connection between the tubular shaft $m$ may be effected instead of directly by means of a system of gearing, such as the gear-wheel $p$, attached to said shaft, and the wheels $p'$ $p^2$, engaging with a circular rack $p^3$, formed in the plate $B^2$.

For starting and stopping the motor the upper end of the lever G previously referred to is connected, by means of an eccentric strap and rod $r$, with an eccentric $r'$, attached to the lower end of a tubular shaft $r^2$, extending through the tubular shaft $m$, and provided at its upper end and above the gear-wheel $j$ with a bevel-gear $r^3$, into which meshes a bevel-gear $r^4$, rigidly attached to the end of a shaft $r^5$, extending through the tubular shaft $n$ and having at its end which projects beyond the shaft $n$ a hand-wheel $r^6$, placed within convenient reach of the driver. It will be readily understood that when the eccentric $r'$ is turned through the medium of the mechanism just described the lever G is turned about its pivot $g'$ to move the cone F of the clutch F E in or out, according to the direction of rotation of the hand-wheel $r^6$. The engine for effecting the rotation of the traction-wheel may be of any suitable construction and operated by the use of any suitable fluid. In the present example I have made use of an engine comprising two cylinders J, arranged at right angles to each other on the frame K, which is connected with the hanger $B^4$. The connecting-rods 20 of the said engine are connected to the crank-shaft C at its crank $C'$. On the crank-shaft C is mounted a gear 21, meshing with gears 22 and adapted to actuate the valve-gear 23, which may be of any usual construction. For the purpose of igniting the gaseous charge I provide an electric igniter, as shown in Figs. 3 and 3*. On the crank-shaft C is mounted a fly-wheel L, which forms a revolving armature, and adjacent to the same are arranged magnets $L'$, all adapted to form a dynamo adapted to produce a current sufficiently strong to cause a passage of sparks between the pins 24 and the adjacent contacts 25 in the usual manner. It is of course to be understood that a stationary armature could be used and the magnets caused to revolve by connecting the same with the crank-shaft of the motor. Liquid or other fluid may be supplied to the engine, according to its nature, in any usual manner. In the present instance, Figs. 1, 2, and 4, I have shown a tank M, suspended from the bottom of the vehicle and connected with the cylinders of the engine by tubes 26, said tubes entering suitable vaporizers 27, placed in connection with the cylinders and heated by the exhaust-passages 28, as shown in Fig. 4. A suitable pressure-tank $M'$, provided with a pump or like device $M^2$, is used for forcing the liquid into the vaporizers 27.

For controlling the amount of the fuel admitted to the engine and determining the speed of the vehicle I provide novel means, as shown in Figs. 1, 2, and 5, said means being substantially pneumatic and so avoiding links or gears between the driver and the wheel. Said means consist, substantially, of a bulb N or other device for establishing air-pressure for the purpose of controlling the egress of liquid from the nozzle $N'$, which admits liquid to the vaporizer, Fig. 5. Said bulb is connected, by means of a tube 30, passing through the tubular shaft $m$ and through the tubular shaft $r^2$, with one end of a cylinder O, containing a spring-pressed piston 31, which has its rod connected with one arm of a triple crank $O'$. The two other arms of said crank are connected, by means of rods 32, with the arms 33, projecting from the valve-stems of the valves $N'$. These valves may be of any usual form, preferably needle-valve of a usual construction. In Fig. 3 is shown the crank-shaft provided with a tubular end, into which enters the part F of the friction-clutch for coupling the crank-shaft and traction-wheel. Another construction is shown in Fig. 11, where the crank-shaft $C^*$ is made solid and the movable part or cone of the clutch $F'$ is mounted to slide on the crank-shaft and to engage with the gear-wheel H'. The clutch is moved back and forth on the crank-shaft by a lever G', connected at its upper end with a slide 35, having thereon a rack 36, engaged by a toothed segment 37, secured to the lever end of the tubular shaft $r^2$, which is turned, as shown in Figs. 1 and 6, by its connection with the hand-wheel $r^6$.

As before stated, the bearing-plate is supported by means of a bracket B, which is hinged at 38 to the body or platform of the vehicle, and is provided with one or more inwardly-extending tails or lugs 39, provided with one or more spring-arms having openings at their inner ends, through which pass adjusting-screws 41, suspended from the bottom of the body or platform of the vehicle and provided with adjusting-nuts 42, by means of which the tension of the springs can be regulated. The springs 40 may be in the form of compound springs built up in the manner of carriage-springs, and preferably I use two or more thereof. It will be readily understood that in view of this flexible or spring connection of the parts carrying the motor-wheel the traction-wheel can move relatively with respect to the body of the vehicle in a vertical plane, and therefore vibrations are taken up by said wheel and not transmitted to the vehicle when traveling on rough roads or in encountering obstacles on an ordinarily good road.

It will be seen from Figs. 1 and 7 that the wheel, together with its driving mechanism and motor, the means for starting and stopping and for revolving the same about a vertical axis, the brackets B, and springs 40, are all substantially a unit and are carried by the hinge or hinges 38. By removing the hinges, which may be in the form of bolt-hinges, the traction-wheel and the parts thereto appertaining, as just described, may be removed and replaced by another traction-wheel or applied to another vehicle.

By making the parts of the vehicle so as to readily interchangeable and adapted to fit corresponding parts on the wheel a new wheel and its parts can be rapidly and easily put in place of a damaged wheel, or, if the vehicle is damaged, the wheel can be applied to another vehicle.

It is of course to be understood that I do not wish to restrict myself to the details of construction shown, as it is evident that the same can be changed without departing from the spirit of my invention, the essential features of my invention being the wheel D, adapted to revolve about a substantially vertical axis and provided with means for its propulsion and complete rotation about a horizontal axis, so that the direction of the vehicle can be reversed without the use of complicated reversing mechanism, and also means for rapid coupling and uncoupling said wheel from the vehicle as a driving or propelling agent and the means for igniting the charge of gaseous or liquid fuel and the means for controlling the valve or valves of the motor by pneumatic contrivance and the flexible connection between the motor-wheel and the body of the vehicle. It is also evident that instead of using a motor on one side of the wheel two motors distributed on opposite sides of the wheel and both connected with the crank-shaft $C^*$, Fig. 11, could be employed.

What I claim as new is—

1. The combination in a vehicle-wheel having a motor thereon, a hanger for suspending said motor and said motor having its crank-shaft extended through the bearings of said wheel and made hollow, of a pinion mounted loosely upon said crank-shaft, and means within the crank-shaft for clutching said loosely-mounted pinion to the said crank-shaft, substantially as described.

2. The combination of a vehicle-wheel comprising a rim, a hub and spokes or a web for connecting the hub to the rim and a circular rack, a motor placed on said wheel, hangers for supporting the wheel in one of which the crank-shaft of the motor is mounted, one end of said crank-shaft being hollow, a clutch mechanism, and an operative connection between the clutch mechanism and the means within the reach of the operator for operating the clutch, substantially as described.

3. The combination with a vehicle-wheel supported by hangers, of a motor on said wheel suspended by one of the hangers and said motor having its crank-shaft extending through the hubs of said wheel, a pinion mounted loosely upon said crank-shaft, a clutch mechanism located exterior to the crank-shaft, means placed within reach of the driver or operator, and an operative connection between said clutch mechanism and the means within reach of the driver or operator, substantially as described.

4. The combination with a vehicle-wheel having a motor thereon, of a plate provided with hangers from which the wheel and motor are suspended so as to be free to rotate, a crank-shaft for said motor suitably mounted, and means for coupling said crank-shaft with said wheel; and said plate, hangers, wheel and motor being arranged so as to be capable of turning as a whole completely about a vertical axis, substantially as described.

5. The combination with a vehicle-wheel having a motor thereon, of a plate mounted to turn about a vertical axis through a complete turn, hangers attached to said plate and supporting said wheel and motor, a bearing-plate A provided with hinge connections, cushion-springs attached to said plate and to the body of the vehicle, and operative means for starting, stopping and completely revolving said wheel about its vertical axis placed within reach of the driver or operator, substantially as described.

6. A motor-wheel comprising a wheel mounted to rotate about a horizontal axis, and provided with a circular rack, a motor provided with a crank-shaft extending through the bearing of said wheel, a clutch having one of its parts affixed exterior to said crank-shaft and its other part mounted loosely on said shaft and placed in operative connection with the circular rack on said wheel, and means for coupling and uncoupling said clutch adapted to be operated by the driver or attendant, substantially as described.

7. A motor-wheel comprising a wheel mounted to rotate about a horizontal axis, a motor provided with a crank-shaft extending through the bearing of said wheel, a clutch having one of its parts affixed exterior to said crank-shaft and its other parts mounted loosely on said shaft and placed in operative connection with the said wheel, and means for coupling and uncoupling said clutch adapted to be operated by the driver or attendant, substantially as described.

8. The combination with a vehicle, of a motor-wheel having its frame in hinged connection with the body or frame of the vehicle, a spring-cushion interposed between said motor-wheel and the body or frame of the vehicle, and means for starting, stopping and rotating said wheel attached to the hinged frame of said wheel, substantially as described.

9. The combination with a vehicle, of a motor-wheel supported in a frame adapted to be turned about a vertical axis, and a supporting-plate to which said frame is attached; said supporting-plate being hinged to the body of the vehicle and provided with a spring-cushion and carrying means for starting, stopping and turning the wheel, substantially as described.

10. The combination with a vehicle of a bracket hinged to said vehicle and supporting a bearing-plate, a plate B' mounted to rotate on said bearing-plate and provided with means for supporting the wheel and the motor, means for starting, stopping and rotating said wheel, and a spring-cushion interposed between said brackets and the body of the vehicle, substantially as described.

11. In combination with a propelling device for vehicles comprising a wheel having self-contained motive means, and said wheel being adapted to form part of the supporting means for vehicles, a plate or web for supporting said wheel, and means on said plate or web for operating said motive means placed within the reach of the driver, of vehicles provided with hinge straps or brackets adapted to receive a hinge connection on the plate or web of the propelling device so as to quickly attach and detach said propelling device to and from the said vehicles, as and for the purpose set forth.

12. The combination with a vehicle-wheel having a gas-motor thereon, of a generator of electricity actuated from the motor-shaft, an igniter for the motor, and electrical connections between said igniter and the generator; all such parts being adapted to travel in a parallel plane with the wheel, substantially as described.

13. The combination with a motor-wheel, of a generator of electricity actuated from the engine-shaft, an igniter for the motor, and electrical connections between said igniter and the generator; all such parts being adapted to travel longitudinally with the wheel, substantially as described.

14. The combination with a vehicle, of hinges fastened to its frame or body, spring-cushions connected with the bearing-plate from which the wheel and motor are supported and said bearing-plate being connected with said hinges, means attached to the wheel for starting, stopping and completely revolving said wheel about a vertical axis without stopping the motor placed within reach of the driver, and said wheel being provided with means for producing a current of electricity for the purpose of igniting the charges of gaseous fuel and also with a pneumatic device for controlling the admission of fuel to the engine—all within reach of the driver or operator, thus forming a complete power-wheel for the propulsion of the vehicle, substantially as described.

In testimony whereof I have hereunto set my hand in the presence of two subscribing witnesses.

JULIUS WM. WALTERS.

Witnesses:
E. P. HENDRICKSON,
A. FABER DU FAUR, Jr.